(12) United States Patent
Ruch et al.

(10) Patent No.: US 11,213,875 B2
(45) Date of Patent: Jan. 4, 2022

(54) PRESSING TOOL WITH SENSOR SYSTEM FOR IDENTIFYING A WORKPIECE

(71) Applicant: Von ARX AG, Sissach (CH)

(72) Inventors: Matthias Ruch, Efringen-Kirchen (DE); Rudolf Kreuzer, Buchs (CH)

(73) Assignee: Von ARX AG, Sissach (CH)

( * ) Notice: Subject to any disclaimer, the term of this patent is extended or adjusted under 35 U.S.C. 154(b) by 95 days.

(21) Appl. No.: 16/569,947

(22) Filed: Sep. 13, 2019

(65) Prior Publication Data

US 2020/0122219 A1  Apr. 23, 2020

(30) Foreign Application Priority Data

Oct. 19, 2018  (EP) .................................... 18201498

(51) Int. Cl.
  *B21D 39/04*  (2006.01)
  *B25B 27/10*  (2006.01)
  *B25B 27/14*  (2006.01)

(52) U.S. Cl.
  CPC ............ *B21D 39/046* (2013.01); *B25B 27/10* (2013.01); *B25B 27/146* (2013.01); *B21D 39/048* (2013.01); *G05B 2219/25294* (2013.01); *G05B 2219/31446* (2013.01); *Y10T 29/5367* (2015.01)

(58) Field of Classification Search
  CPC ..... B25B 27/10; B25B 27/146; B21D 39/048; Y10T 29/5367; B25F 5/00; G05B 2219/25294; G05B 2219/31446
  USPC ...................................................... 173/7, 183
  See application file for complete search history.

(56) References Cited

U.S. PATENT DOCUMENTS

| 6,035,775 A * | 3/2000 | Nghiem ............... B21D 39/046 100/233 |
| 6,164,106 A * | 12/2000 | Nghiem ................. B21D 39/04 29/720 |
| 6,378,194 B1 * | 4/2002 | Nghiem ................. B21D 39/04 29/407.05 |
| 7,421,871 B2 * | 9/2008 | Goop ..................... B21D 39/04 29/720 |
| 9,808,851 B2 * | 11/2017 | Thorson ............... G01D 5/2458 |
| 10,197,422 B2 * | 2/2019 | McColgan ............. G01D 7/002 |
| 10,427,201 B2 * | 10/2019 | Bungter ................. B25B 27/10 |
| 10,618,151 B2 * | 4/2020 | Kanack ............... B25B 23/1456 |

(Continued)

FOREIGN PATENT DOCUMENTS

| DE | 202011004653 | 6/2011 |
| EP | 2308648 | 4/2011 |
| EP | 2794191 | 10/2014 |

OTHER PUBLICATIONS

European Search Report dated May 9, 2019; Application No. EP 18201498.5; 7 pages.

(Continued)

*Primary Examiner* — Jason L Vaughan
(74) *Attorney, Agent, or Firm* — Mark E. Bandy; Rankin Hill & Clark, LLP

(57) ABSTRACT

A pressing tool, particularly a pipe pressing tool, for plastically deforming a tubular workpiece, particularly a fitting, is described. The pressing tool includes pressing jaws and a motor which is adapted to drive the pressing jaws in order to apply a force to the workpiece. Further, a method of operating such a pressing tool, and pressing jaws as well as a tubular workpiece are described.

21 Claims, 2 Drawing Sheets

(56) References Cited

U.S. PATENT DOCUMENTS

| | | | |
|---|---|---|---|
| 2015/0053447 A1* | 2/2015 | Da Rocha | B25D 11/005 173/7 |
| 2015/0247745 A1 | 9/2015 | McClogan | |
| 2018/0131151 A1* | 5/2018 | Chahrour | B21D 39/048 |
| 2018/0161969 A1 | 6/2018 | Rosani | |

OTHER PUBLICATIONS

Chinese Office Action dated Jul. 20, 2021; Application No. 2019109925068; 20 pages.

* cited by examiner

PRESSING TOOL WITH SENSOR SYSTEM FOR IDENTIFYING A WORKPIECE

FIELD

The present invention relates to a pressing tool for plastically deforming a tubular workpiece, and particularly a fitting. Further, the invention relates to a method of operating such a pressing tool, pressing jaws to couple to a pressing tool as well as a tubular workpiece, for example a fitting.

BACKGROUND

Several methods of joining tubular workpieces are known in the prior art. According to one of said methods, a small pipe is put into a larger pipe, whereupon the two are then pressed against each other. In other cases, compressing is carried out using a compression fitting. For this purpose, pressing tools, such as pipe pressing tools, may be used in order to join a pipe to a compression fitting. Such a fitting may be embodied as a piping and plumbing fitting that may be used as an adapter in a pipe, for example. A fitting may be made from various materials, for example copper, plastics, composite material, stainless steel and/or steel.

A pressing tool may comprise pressing jaws made from metals primarily made from steel, which may be interchangeable. By means of the pressing jaws, a force may be applied to the fitting in order to plastically deform it in such a manner that the fitting abuts the pipe as closely, tightly and firmly as possible. For this purpose, the pressing jaws may be designed as swiveling arms which may be equipped with corresponding pressing jaws. When using such a pressing tool, the pressing jaws may be pressed together in order to compress press a fitting disposed between them around a pipe. The pressing tool may be hand-held and operated by a motor.

When such conventional pressing tools are used, usually the maximum pressing force of such tools is always applied during pressing, independently of the fittings actually used. However, this may be disadvantageous as each kind of fitting has its characteristic pressing characteristics. Accordingly, a fitting made from steel, should be pressed differently than a fitting made from plastics, for example, also in order to guarantee a positive joint as optimal as possible and a long durability of the pressed fitting.

Thus, the problem that underlies the present invention is to press a fitting together with a pipe in a manner that is as optimal and material-friendly as possible. Particularly, an improved (pipe) pressing tool is to be provided which makes such pressing possible. These and other problems which will become apparent for the person skilled in the art from the following description are solved by a pressing tool as described herein, a method of operating a pressing tool as described herein, pressing jaws as described herein, and a tubular workpiece as described herein.

SUMMARY

The difficulties and drawbacks associated with previous approaches are addressed in the present subject matter as follows.

In one aspect, the present invention provides a pressing tool for plastically deforming a tubular workpiece. The pressing tool comprises pressing jaws, and a motor adapted to drive the pressing jaws in order to apply a force to the workpiece. The pressing tool also comprises a sensor system adapted to identify the workpiece and provide sensor data. And, the pressing tool comprises a control which is adapted to control the motor based on the sensor data.

In another aspect, the present invention provides a method of operating a pressing tool for plastically deforming a tubular workpiece. The method comprises providing a pressing tool including pressing jaws, a motor adapted to drive the pressing jaws in order to apply a force to the workpiece, a sensor system adapted to identify the workpiece and provide sensor data, and a control which is adapted to control the motor based on the sensor data. The method also comprises identifying the workpiece by means of the sensor system. The method additionally comprises gripping the workpiece by means of the pressing jaws. And, the method comprises applying a force to the surface of the gripped workpiece by means of the pressing jaws based on the identification of the workpiece.

In yet another aspect, the present invention provides pressing jaws to couple to a pressing tool for plastically deforming a tubular workpiece. The pressing jaws comprise a sensor system adapted to identify the tubular workpiece.

In still a further aspect, the present invention provides a tubular workpiece adapted to be plastically deformed by a pressing tool. The workpiece comprises means adapted to provide an identifier for the identification of the workpiece.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
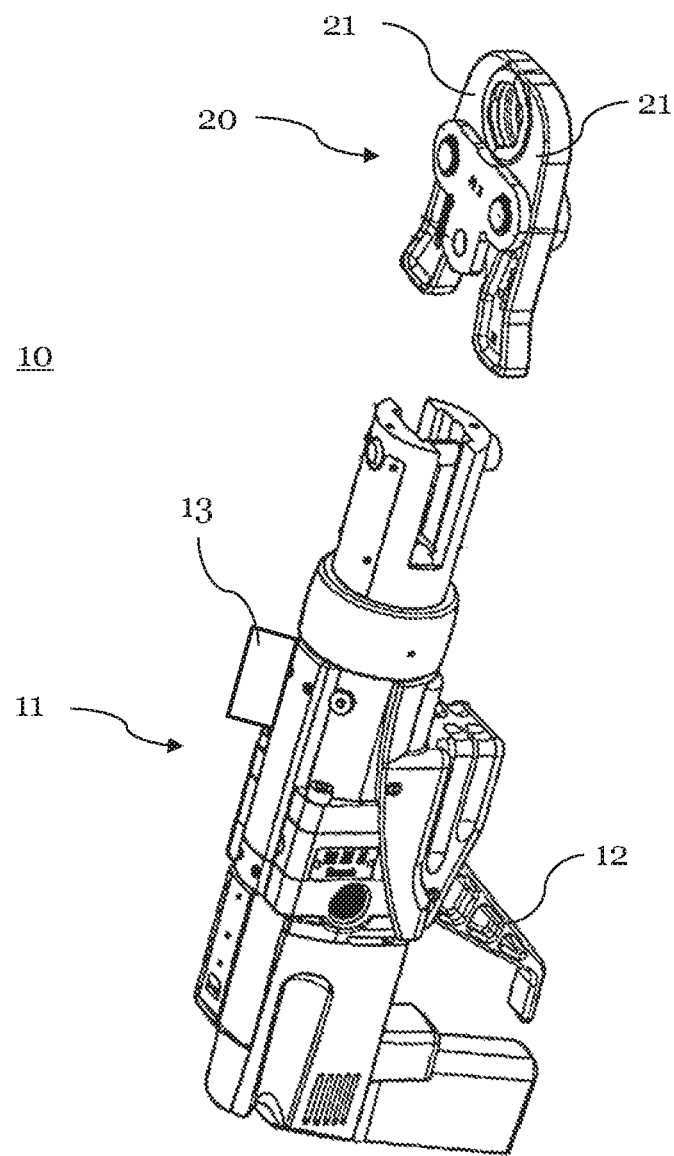
FIG. 1 shows a pressing tool according to an embodiment of the present invention.

The present invention relates to a pressing tool for plastically deforming a tubular workpiece. The tubular workpiece may be a fitting, and be pressed together with two pipes in order to join them, for example. The tubular workpiece may also be (a part of) a tube crimping lug (also called fitting hereinafter) as used in the electronics industry for connecting cables or stranded wires. For example, the fitting may be made from copper, plastics, composite material and/or (stainless) steel, at least partially. The pressing tool, in turn, may be adapted to plastically deform such a tubular workpiece, such as a fitting, for example, in such a manner that it is joined to a part of the pipe arranged in the fitting. In particular, by means of the pressing tool, pressing may be performed in order to inseparably join together a fitting and a pipe by a positive and/or force-closed joint. For example, the fitting may be specified according to the standard DIN EN 1254-7.

The pressing tool comprises pressing jaws. Said pressing jaws may be movable relative to each other and may be closed and spread apart, for example, so that a tubular workpiece may be arranged between the pressing jaws in the spread state, for example. The pressing jaws may be interchangeable and comprise jaws for pressing, crimping or cutting. For example, the pressing tool may comprise two pressing jaws.

The pressing tool further comprises a motor which is adapted to drive the pressing jaws in order to apply a force to the workpiece. By means of the motor, the pressing jaws may be moved relative to each other and be driven into the closed state, for example. Here, the motor may provide at least some of the force that is necessary to deform the tubular workpiece, for example for joining a fitting to a part of a tube. For this purpose, the motor may be directly coupled to the pressing jaws or coupled to the pressing jaws via a transmission in order to transmit the motive power. The force acting upon the pressing jaws may be variably set here by correspondingly varying the motor parameters or other parameters (such as transmission settings), for example. Additionally, the motor may comprise a hydraulic system in order to apply a force to the workpiece. In this context, a safety valve may be controlled, for example.

Further, the pressing tool comprises a sensor system that is adapted to identify the workpiece, which for example is a fitting. The sensor system may be adapted to recognize an individual workpiece or to recognize the kind of a workpiece. For this purpose, the sensor system may comprise sensing means (e.g. a sensor) as an interface with the workpiece and corresponding means for analysis which may be embodied by means of a processor and/or memory with corresponding program code. In this context, the sensing means may be provided at the pressing tool separately of the means for analysis. Here, the sensor system may be supplied via an energy source arranged at the pressing tool which may also supply energy to the motor, for example. Further, the sensor system may be actuated by a user/operator by means of a push button in order to perform the identification. In this way, the manner in which and the time at which the identification is to take place may be purposefully controlled. In many embodiments, the sensor system provides sensor data.

Hence, the identification does not necessarily mean that a single workpiece is identified as an individual workpiece. Rather, it suffices for a workpiece to be identified or recognized as being different from another workpiece. For example, the workpiece may be classified based on its model number in the course of the identification. Hence, in one example, it may be recognized that a stainless-steel fitting with a diameter of 15 mm is present. Here, data resulting from the sensor system, e.g. sensor data, may characterize the identified workpiece.

Further, the pressing tool comprises a control which is adapted to control the motor based on the sensor data. Hence, depending on the identified workpiece, the motor is correspondingly controlled. Depending on which kind/type of workpiece was recognized, the pressing jaws may be differently driven by the motor, for example, in order to optimally deform the workpiece ultimately.

Hence, the present invention allows carrying out the deformation depending on the object to be deformed. In this way, according to the type of workpiece used, an individual pressing force may be applied by means of the motor in order to achieve an optimal and material-friendly deformation. In this context, the use of the sensor system makes an automatic identification of the workpiece and forwarding the corresponding data to the motor possible, which means that the user or operator of the pressing tool themselves do not have to provide any input and, accordingly, is not additionally burdened.

Preferably, the pressing tool comprises memory means with a database. In this context, the database preferably comprises control parameters for a plurality of workpieces for controlling the pressing tool for each one of the plurality of workpieces. Thus, according to the identification of the workpiece, corresponding control parameters may be loaded from the memory and/or from the database and be used in order to operate the motor. For example, control parameters for stainless-steel fittings and different control parameters for copper fittings may be stored in the database. Depending on whether a stainless-steel fitting or copper fitting was identified by means of the sensor system, the corresponding control parameters may be loaded from the database and be used by the control in order to control the pressing tool and, ultimately, the motor. For different characteristics of the workpieces (material, size, shape, etc.), corresponding control parameters may be stored in the database in order to facilitate optimal pressing or deforming of the respective workpiece. In a preferred embodiment, accessing the database via a wired or wireless interface in order to update the content of the database, for example, is possible.

Particularly preferably, the control parameters comprise pressing parameters which preferably comprise a maximum pressing force, a pressing speed, a pressing path, and/or a pressing duration. Combinations of these parameters may be used. Thus, depending on the kind of workpiece, for example certain pressing forces, pressing speeds, pressing paths and/or pressing durations that are to be used by the pressing tool for pressing or deforming the fitting together with the part of the pipe, for example, may be preset. Here, the pressing path may be described by the position of the servo piston of the pressing tool. Here, the person skilled in the art appreciates that corresponding control parameters should be stored in the database, according to the intended purpose of the pressing tool. Furthermore, the control parameters may particularly comprise motor parameters which preferably comprise a motor speed, a motor output, and/or an oil pressure, in particular. Combinations of these parameters may be used. Thus, depending on the kind of workpiece, various motor parameters may be stored in the database, which parameters may be loaded based on the identified workpiece in order to ultimately deform the workpiece. The person skilled in the art appreciates that the pressing parameters or motor parameters may also comprise transmission parameters which may control the transmission of force from the motor to the pressing jaws. Preferably, occurring parameters may be compared to expected parameters in this process. For example, a pressing speed occurring at a set maximum pressing force may be analyzed. The results may allow a conclusion regarding the wear and operating life of the pressing jaws so that failures may be prevented.

In a preferred embodiment, the sensor system comprises one or more of a camera, an optical scanner, an RFID reader, an NFC reader and/or a Bluetooth module. The camera may be an optical camera which may have a resolution and quality that is sufficient for identifying at least the kind of workpiece. For example, a fitting with a diameter of 15 mm may be identified by means of the camera. Furthermore, based on color values, conclusions may be drawn as to the material of the workpiece. For example, the camera may unambiguously recognize specific shapes of fittings and, thus, allow the identification of the kind of the workpiece. By means of the optical scanner, the RFID reader, the NFC reader and/or the Bluetooth module, data or identifiers may be recognized which, for example, may be provided by the workpiece itself and allow for the workpiece to be identified.

For example, the optical scanner may recognize a bar code or a QR code that is arranged on the workpiece. In order to guarantee identification by means of the optical camera or optical scanner, a lighting means may also be provided at the pressing tool which may lighten or illuminate at least part of the region that may be sensed by the camera or by the scanner. Here, the sensor system may be connected to an energy supply of the pressing tool so that, for example, only one energy source (e.g. a rechargeable battery) has to be provided in order to supply energy to the motor and the sensor system.

Preferably, the range of the communication of the sensor system is restricted to short ranges. For example, the communication range of the sensor system may be between 0 and 5 meters, preferably between 0.001 and 4 meters, more preferably between 0.002 and 3 meters, more preferably between 0.005 and 2 meters, more preferably between 0.01 and 1 meter, more preferably between 0.05 and 0.5 meters. Thus, the sensor system is only able to identify workpieces within the communication range. This makes it possible that only workpieces that actually are to be deformed are identified. An unintentional identification of distant workpieces not to be deformed is at least partially prevented.

Preferably, the sensor system is adapted to recognize a bar code on the workpiece, a QR code on the workpiece, an identifier in an RFID transponder at the workpiece, an identifier in an NFC transponder at the workpiece and/or an identifier in a Bluetooth module at the workpiece. The person skilled in the art appreciates that the workpiece may be equipped with corresponding codes or transponders or modules in order to provide the pressing tool with corresponding data for identifying the workpiece, or at least the kind of workpiece.

RFID (radio-frequency-identification) makes the identification of the workpiece by means of electromagnetic waves possible. In this way, the workpiece may be automatically identified without contact by means of RFID technology. An RFID reader arranged at the pressing tool may read an identifier which may be provided by a corresponding RFID transponder of the workpiece. Said identifier may identify the workpiece, or at least the kind of workpiece.

NFC technology, or near field communication, is an international communication standard based on RFID technology for the contact-less exchange of data by means of electromagnetic induction. Here, data transmission rates of up to 424 Kbit/s maximum may be achieved. The communication between the corresponding NFC devices may be active-passive or active-passive.

Bluetooth communication facilitates short-range data transfer between devices by means of radio technology. Communication takes place by means of an industry standard that was developed accordingly, for example according to the standard IEEE 802.15.1.

Preferably, the sensor system is adapted for feature recognition of characteristic features of the workpiece, particularly of characteristic geometrical features of the workpiece. For example, a shape and/or size of the workpiece may be recognized by means of the sensor system. Based on said characteristic features, at least the kind of workpiece may be identified, and subsequently the motor may be accordingly controlled in order to optimally deform the workpiece. In a preferred embodiment, (characteristic features in the form of) the lot and/or serial numbers of the workpiece may also be recognized by means of the sensor system. In this manner, the pressing process may be configured to be trackable.

In a preferred embodiment, the sensor system is at least partially covered and/or protected and/or blocked by an element of the pressing tool in a first configuration of the pressing tool and is exposed by the element in a second configuration of the pressing tool. For example, a sensor of the sensor system may be covered by a part of the housing of the pressing tool, which may protect the sensor from pollution or other ambient influences. When the pressing jaws are spread apart and/or opened, which may correspond to the second configuration, (at least part of) the sensor is uncovered and/or exposed. Now, the workpiece may be identified by means of the sensor system. During the subsequent deformation of the workpiece, the pressing jaws are moved towards each other and/or put into the first configuration, which may, in turn, cover (at least part of) the sensor by a part of the housing. This also ensures that the identification by means of the sensor system only takes place if a deformation of the workpiece is to take place. In this way, any unintentional wrong identification of a workpiece that is in proximity (e.g. lies on a workbench) is prevented.

In a preferred embodiment, the sensor system is adapted to perform the identification of the workpiece when the pressing jaws are being spread apart, e.g. in order to grip the workpiece. Consequently, the sensor system may be activated when the pressing jaws are correspondingly moved in order to receive the workpiece for the purpose of deformation. This also guarantees that the identification of the workpiece only takes place when the latter is to be deformed. The activation of the sensor system may take place mechanically, for example by means of a release mechanism which communicates with a bolt of the pressing tool and a corresponding shape at one of the pressing jaws.

Preferably, the pressing jaws are free from the sensor system. Hence, according to this embodiment, no elements of the sensor system are arranged at the pressing jaws. Thus, the sensor system may, for example, exclusively be arranged at a handle of the pressing tool. This makes easy interchangeability of the pressing jaws possible. In a different preferred embodiment, at least part of the sensor system is arranged at the pressing jaws, particularly in a recess of the pressing jaws in order to protect the sensor system, for example. Here, the sensor system may be coupled to the motor of the pressing tool via a coupling interface. By means of such sensor system, it is possible to generally check that the correct fitting is present. In an embodiment, pressing can only be enabled if the correct fitting was recognized.

Preferably, the sensor system is at least partially arranged at a housing of the pressing tool, between the jaws of the pressing jaws. Here, the viewing direction of the sensor particularly is arranged in the longitudinal direction along the pressing jaws. The sensor system may be protected from pollutions or other surrounding influencing factors thanks to this arrangement as well as it is at least partially shielded by the jaws of the pressing jaws. The longitudinal direction may correspond to a direction of action of the pressing tool and/or represent a gripping direction for gripping the workpiece by means of the gripping jaws. Particularly preferably, the jaws of the pressing jaws at least partially cover the sensor system when the pressing jaws are closed. Furthermore, the jaws may preferably expose the sensor system when the pressing jaws are spread apart for gripping the workpiece. In the closed system, the jaws at least partially shield the sensor system to protect it from surrounding influencing factors.

Preferably, the pressing tool comprises a protocol storage adapted to store the sensor data and control data. In this manner, the deformation process may be configured to be trackable. All or some data on the deformation process may be stored in the protocol storage in order to make quality control of individual deformations possible as well. Access to the protocol storage is possible via a wireless or wired interface for reading the corresponding data.

Preferably, the pressing tool is adapted to compare an actual pressing curve to an expected pressing curve. Preferably, based on the comparison, the fitting may be identified. Here, the actual pressing curve may result from the pressure in the working cylinder via the path of the servo piston of the pressing tool, while the expected pressing curve results from the pressing jaws and the fittings stored for the pressing jaws.

The present invention further relates to a method of operating a pressing tool in accordance with the descriptions above for plastically deforming a tubular workpiece such as a fitting, the method comprising the following steps: identifying the workpiece by means of the sensor system; gripping the workpiece by means of the pressing jaws; and applying a force to the surface of the gripped workpiece by means of the pressing jaws based on the identification of the workpiece. In many versions, the methods includes providing or using the pressing tool as described herein. For the purpose of applying the force, the motor of the pressing tool may be accordingly controlled. Depending on the identification step, for example a reduced or increased pressing force may be set, depending on the workpiece that was identified.

In accordance with the present invention, the method according to the invention may also be stored in a computer program which is able to cause a corresponding system to perform the individual steps.

Further, the present invention relates to pressing jaws to couple to a pressing tool for plastically deforming a tubular workpiece, particularly a fitting. For example, said pressing jaws may be coupled to a pressing tool in accordance with the descriptions above. In this context, the pressing jaws comprise a sensor system adapted to identify the tubular workpiece. The pressing jaws may be interchangeably coupled to the pressing tool. The explanations regarding the sensor system above apply analogously.

The present invention further relates to a tubular workpiece, particularly a fitting, which is adapted for plastic deformation by a machine. The tubular workpiece may be deformed according to the descriptions above by a pressing tool, for example. In this context, the workpiece, particularly a fitting, may be designed in accordance with the descriptions above and, for example, be made from copper, plastics, composite material and/or (stainless) steel. Here, the tubular workpiece comprises a means which is adapted to provide an identifier for the identification of the workpiece. In this context, the means may be designed according to the descriptions above, for example as a bar code or QR code. In particular, the means may comprise a transponder, particularly RFID or NFC transponder, which is adapted to provide the identifier.

In FIG. 1, a pressing tool 10 according to an embodiment of the present invention is shown. In this context, pressing tool 10 comprises a handle 11 which may be hand-held by an operator and/or user. A pressing jaw assembly 20 may be removably coupled to handle 11. Pressing jaw assembly 20 comprises two pressing jaws 21 by means of which a fitting may be gripped and plastically deformed. For this purpose, a motor (may be arranged in the housing) which may drive pressing jaw assembly 20 and, ultimately, move pressing jaws 21 via a coupling interface in order to deform the fitting is provided in handle 11. In order to deform the fitting, an operator may actuate a corresponding actuating lever 12. By accordingly actuating lever 12, pressing jaws 21 are spread apart in order to grip a fitting and then pressed together in order to deform the fitting.

Further, at pressing tool 10, a sensor system 13 is provided which is arranged at handle 11. In this embodiment, sensor system 13 is partially implemented by a Bluetooth module. By actuating lever 12 for spreading pressing jaws 21 apart in order to grip a fitting, Bluetooth module 13 is activated. Here, in the activated state, Bluetooth module 13 may recognize an identifier of a corresponding Bluetooth module provided at the fitting. Based on said identifier, the fitting may be identified by means of sensor system 13. Further, when lever 12 is actuated accordingly, the motor is driven in order to apply a force to the fitting arranged between pressing jaws 21. For this purpose, the motor is controlled depending on which workpiece and/or which kind of fitting was identified.

Figure 2:
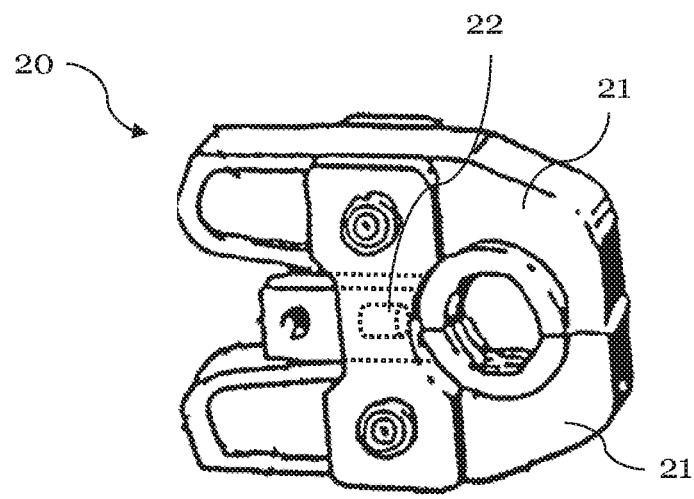
FIG. 2 shows a pressing jaw assembly with pressing jaws according to an embodiment of the present invention.

In FIG. 2, a pressing jaw assembly 20 with pressing jaws 21 according to an embodiment of the present invention is shown. The pressing jaw assembly may be removably coupled to a handle of a pressing tool. Between pressing jaws 21, a sensor system 22 is arranged which, in the closed state of pressing jaws 21 shown here, is covered by the latter. When pressing jaws 21 are spread apart in order to grip a fitting, sensor system 22 is at least partially exposed. In the embodiment shown here, sensor system 22 comprises an optical camera. When pressing jaws 21 are spread apart, optical camera 22 may sense, recognize and, ultimately, identify the pressing to be gripped through pressing jaws 21. After the fitting has successfully been deformed, optical camera 22 is covered again by the closed pressing jaws 21.

Figure 3:
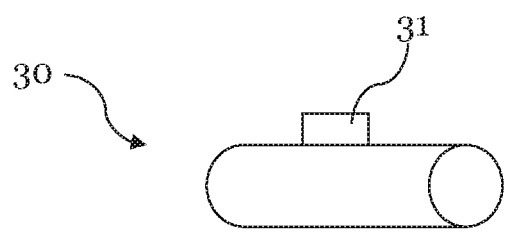
FIG. 3 shows a tubular workpiece according to an embodiment of the present invention.
Figure 4:
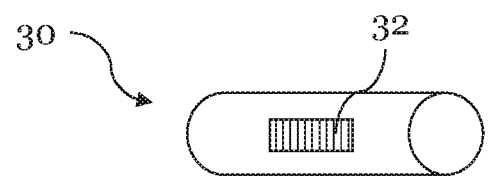
FIG. 4 shows a tubular workpiece according to another embodiment of the present invention.

In FIGS. 3 and 4, two possible embodiments of tubular workpieces according to other embodiments of the present invention are shown. The workpieces shown are designed in the form of fittings 30 here. In this context, fittings 30 comprise means 31, 32 for providing an identifier for the identification of the respective fitting 30, for example to a pressing tool 10 according to FIG. 1 and/or via a pressing jaw assembly 20 according to FIG. 2.

Fitting 30 shown in FIG. 3 comprises a Bluetooth module 31 on which an identifier is stored. Here, the identifier characterizes at least the kind of fitting 30. By means of a corresponding Bluetooth module at a pressing tool, for example by means of Bluetooth module 13 described with respect to FIG. 1, the identifier stored on Bluetooth module 13 of fittings 30 may be read in order to identify fitting 30.

A bar code 32 is arranged on fitting 30 illustrated in FIG. 4. In this context, bar code 32 characterizes at least the kind of fitting 30. Said bar code 32 may be recognized by means of a camera or an optical scanner, for example, by means of optical camera 22 described with respect to FIG. 2, for example, in order to ultimately identify fitting 30.

The person skilled in the art appreciates that individual elements of the embodiments mentioned above may be combined or exchanged with each other.

In a preferred embodiment, pressing jaws 21 may be geared towards steel fittings, for example. If a fitting is identified as a copper fitting by means of the sensor system, an alert or error message may be issued. Alternatively or additionally, the pressing force may be accordingly adapted to optimally press the copper fitting by means of the pressing jaws geared towards steel fittings. The person skilled in the art appreciates that this principle is not limited to steel and copper fittings.

In another preferred embodiment, the pressing tool may also issue an alert or an error message if a pressing curve actually present deviates from an expected pressing curve.

Here, the actual pressing curve may result from the pressure in the working cylinder by the path of the servo piston, while the expected pressing curve may result from a combination of pressing jaws and fittings to be expected (with respect to the used pressing jaws), and may be stored in the device. It is possible to draw conclusions as to the fitting actually present from such a deviation, and the pressing force may accordingly be adapted. For example, when a 16 mm pressing jaw assembly is used, a 15 mm fitting may be pressed, and this may be recognized from the comparison of the pressing curves.

LIST OF REFERENCE SIGNS

10 Pressing tool
11 Handle
12 Sensor system with Bluetooth module
13 Actuating lever of the pressing tool
20 Pressing jaw assembly
21 Pressing jaws
22 Sensor system with optical camera
30 Fitting
31 Bluetooth module at the fitting
32 Bar code at the fitting Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A pressing tool for plastically deforming a tubular workpiece, the pressing tool comprising:
   pressing jaws;
   a motor adapted to drive the pressing jaws in order to apply a force to the workpiece;
   a sensor system adapted to identify the workpiece and provide sensor data, wherein at least a portion of the sensory system is arranged in a recess of the pressing jaw;
   an element that at least partially covers, protects, or blocks the sensor when the pressing tool is in a first configuration of the pressing tool and the element at least partially exposes the sensor system in a second configuration of the pressing tool; and
   a control which is adapted to control the motor based on the sensor data.

2. The pressing tool according to claim 1, further comprising a storage medium with a database with control parameters for a plurality of workpieces for controlling the pressing tool for each one of the plurality of workpieces.

3. The pressing tool according to claim 2, wherein the control parameters comprise pressing parameters selected from the group consisting of a maximum pressing force, a pressing speed, a pressing path, a pressing duration, and combinations thereof.

4. The pressing tool according to claim 2, wherein the control parameters comprise motor parameters selected from the group consisting of a motor speed, a motor output, an oil pressure, and combinations thereof.

5. The pressing tool according to claim 1, wherein the sensor system is adapted to identify the workpiece within a distance of 0 m to 5 m.

6. The pressing tool according to claim 1, wherein the sensor system comprises at least one of a camera, an optical scanner, an RFID reader, an NFC reader, and a Bluetooth module.

7. The pressing tool according to claim 1, wherein the sensor system is adapted to recognize at least one of a bar code on the workpiece, a QR code on the workpiece, an identifier in an RFID transponder at the workpiece, an identifier in an NFC transponder at the workpiece, and an identifier in a Bluetooth module at the workpiece.

8. The pressing tool according to claim 1, wherein the sensor system is adapted for feature recognition of characteristic features of the workpiece.

9. The pressing tool according to claim 8, wherein the characteristic features of the workpiece include geometrical features of the workpiece.

10. The pressing tool according to claim 1, wherein the sensor system is adapted to identify the workpiece when the pressing jaws are spread apart.

11. The pressing tool according to claim 1, wherein the control provides control data and the pressing tool further comprises a protocol storage adapted to store the sensor data and the control data.

12. The pressing tool according to claim 1 wherein the tubular workpiece is a fitting.

13. A pressing tool for plastically deforming a tubular workpiece, the pressing tool comprising:
    pressing jaws;
    a motor adapted to drive the pressing jaws in order to apply a force to the workpiece;
    a sensor system adapted to identify the workpiece and provide sensor data; and
    a control which is adapted to control the motor based on the sensor data; and
    wherein at least part of the sensor system is arranged at a housing of the tool between the pressing jaws, wherein the viewing direction of the sensor system is arranged in the longitudinal direction along the pressing jaws, wherein the pressing jaws at least partially cover the sensor system when the pressing jaws are closed and wherein the pressing jaws expose the sensor system when the pressing jaws are spread apart for gripping the workpiece.

14. The pressing tool according to claim 13, further comprising a storage medium with a database with control parameters for a plurality of workpieces for controlling the pressing tool for each one of the plurality of workpieces.

15. The pressing tool according to claim 13, wherein the sensor system is adapted to identify the workpiece within a distance of about 0 m to 5 m.

16. The pressing tool according to claim 13, wherein the sensor system comprises at least one of a camera, an optical scanner, an RFID reader, an NFC reader, and a Bluetooth module.

17. The pressing tool according to claim 13, wherein the sensor system is adapted to recognize at least one of a bar code on the workpiece, a QR code on the workpiece, an identifier in an RFID transponder at the workpiece, an identifier in an NFC transponder at the workpiece, and an identifier in a Bluetooth module at the workpiece.

18. The pressing tool according to claim 13, wherein the sensor system is adapted for feature recognition of characteristic features of the workpiece.

19. The pressing tool according to claim 13, wherein the sensor system is adapted to identify the workpiece when the pressing jaws are spread apart.

20. The pressing tool according to claim 13, wherein the control provides control data and the pressing tool further comprises a protocol storage adapted to store the sensor data and the control data.

21. The pressing tool according to claim 13, wherein the tubular workpiece is a fitting.

* * * * *